United States Patent
Soukup

[11] Patent Number: 6,032,430
[45] Date of Patent: Mar. 7, 2000

[54] COUPLING SYSTEM FOR BAR STRUCTURES

[76] Inventor: Eduardo Guillermo Soukup, Km 16 Ruta Ezequiel Bustillo, Bariloche, R. Negro, Argentina

[21] Appl. No.: 08/947,720

[22] Filed: Oct. 9, 1997

[30] Foreign Application Priority Data

Oct. 24, 1996 [AR] Argentina ............... P96 01 04886

[51] Int. Cl.[7] .................. E04C 2/40; F16B 7/08
[52] U.S. Cl. .................. 52/656.9; 52/648.1; 52/693; 52/645; 52/646; 52/655.1; 52/653.2; 403/170; 403/171; 403/172; 403/176; 403/205; 403/403
[58] Field of Search ............... 52/656.9, 655.1, 52/653.2, 648.1, 693, 645, 646, 108, 632, 690; 403/171, 170, 172, 176, 205, 403

[56] References Cited

U.S. PATENT DOCUMENTS

| | | | |
|---|---|---|---|
| 3,507,526 | 4/1970 | Packman et al. | 52/655.1 |
| 3,789,562 | 2/1974 | De Chicchis et al. | 52/648 |
| 3,901,613 | 8/1975 | Anderson | 52/656.9 |
| 4,838,003 | 6/1989 | Zeigler | 52/646 |
| 4,930,930 | 6/1990 | Coppa | 52/655.1 |
| 5,056,291 | 10/1991 | Leung | 52/656.9 |
| 5,101,607 | 4/1992 | Staeger | 52/646 |
| 5,111,631 | 5/1992 | Flood et al. | 52/655.1 |
| 5,119,613 | 6/1992 | Atkinson et al. | 52/655.1 |
| 5,127,759 | 7/1992 | Orbom | 403/171 |
| 5,356,234 | 10/1994 | Vangool | 403/170 |
| 5,406,753 | 4/1995 | Grenci et al. | 52/656.9 |
| 5,430,989 | 7/1995 | Jones | 52/655.1 |
| 5,435,110 | 7/1995 | Stol et al. | 52/656.9 |
| 5,526,614 | 6/1996 | Huang | 52/656.9 |
| 5,549,408 | 8/1996 | Lo | 403/218 |
| 5,794,640 | 8/1998 | Jang | 135/131 |
| 5,797,695 | 8/1998 | Prumack | 403/170 |
| 5,802,798 | 9/1998 | Martens | 52/653.1 |

*Primary Examiner*—Carl D. Friedman
*Assistant Examiner*—Jennifer I. Thissell
*Attorney, Agent, or Firm*—Hughes Hubbard & Reed LLP; Ronald Albramson; Peter A. Sullivan

[57] ABSTRACT

A quick assembling coupling system for bar structures consists of an annular disk containing a number of radial sleeves having their longitudinal axes distributed about the annular disk such that the ends of the bars are held in the sleeves by a prismatic lock cover inserted in the center of the annular disk.

2 Claims, 2 Drawing Sheets

COUPLING SYSTEM FOR BAR STRUCTURES

FIELD OF THE INVENTION

The instant invention relates to a bar coupling for structures, for forming joint connections of structural portions comprised by undeformable poligons for assembling self-carrying structures or structures subjected to controllable stress having he stability required for bearing loads on their cover, ideal for the construction of greenhouses, warehouses, etc.

Particularly, the invention relates to a light joining member, which may be made of stainless materials, without screws, bolts, pins, rivets or welding, its assembling being easy since it requires merely being plugged into the bars, tubular bars or profile bars, locked by a central quick closure means.

BACKGROUND OF THE INVENTION

At present, assembly of this kind of structures has the disadvantage of being a complex tax requiring screwing, welding or rivetting of the parts at each connection, with the resulting consumption of time and risk for operators, also requiring higher precision in the size of each element.

The arrangement of the invention optimizes mounting of the mentioned structures overcoming the mentioned disadvantages.

SUMMARY OF THE INVENTION

More particularly, the bar coupling for structures of the present invention is a part comprised by a support shaped as an annulus interrupted by a plurality of radial tubes having their axes distributed at equal angles, multiples of 360°, and a length equivalent to the width thereof, provided that the minor diameter of said anulus is larger than said length, complemented by a closure formed by a prism generated by a poligon having such sides as tubes at the corresponding coupling, which fits tightly into its central hole with the walls flush to the inner faces thereof, said prismatic lock having an upper cover of projecting contour preventing its passage downwards through said hole.

Thus, assembly of the structure is carried out by introducing into each tube the end of each bar of required the length, such bar being displaceable inside thereof to cause plugging into the coupling corresponding to its other end since, as already mentioned, possibility of advance is slightly higher than the length embraced thereof.

Upon completion of each connection, the prismatic cover is to be introduced as a fixation means, this cover being efficiently positioned by gravity action.

This system allows increasing or decreasing the size of the covered surface and also allows assembly of two adjacent structures with a common coupling.

As a safety device, a lower counter-cover may be used, capable of retaining said prismatic closure cover by threading of a projecting portion thereof, or by means of any quick lock means such as resilient rings, latches, bayonet locks, etc.

It is to be noted that the cavities of the mentioned radial tubes may have different shapes mating with the bar profiles selected for the structures, without departing from the scope of the invention.

A preferred embodiment of the invention will be now described in connection with the accompanying drawings. This is merely an example without limitative or exclusive character.

BRIEF DESCRIPTION OF THE DRAWINGS

In all figures, the same reference numerals correspond to the same or equivalent parts of the exemplary embodiment of the invention.

FIG. 1 shows a coupling A with its annulus support 1 and radial tubes 2 proximal bores of which 3 are positioned at planes transverse thereto defining an hexagonal cavity in which the hexagonal prismatic core 4 fits until its perimetrally projecting cover 5 abuts blocking with its side faces said bores 3 causing locking of the bar ends 6 plugged by distal bores 7.

Further, as a safety device, the counter-cover, with inner threads 8, adjust said cover by its threaded end 9.

Figure 1:
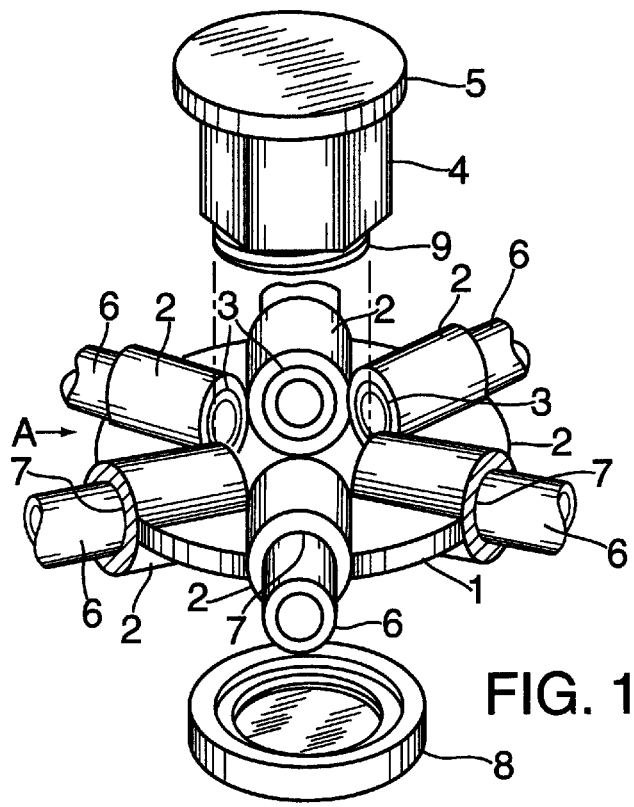
FIG. 1 is an exploded perspective view of the coupling, with the lock cover at the upper part and a lower counter-cover.
Figure 2:
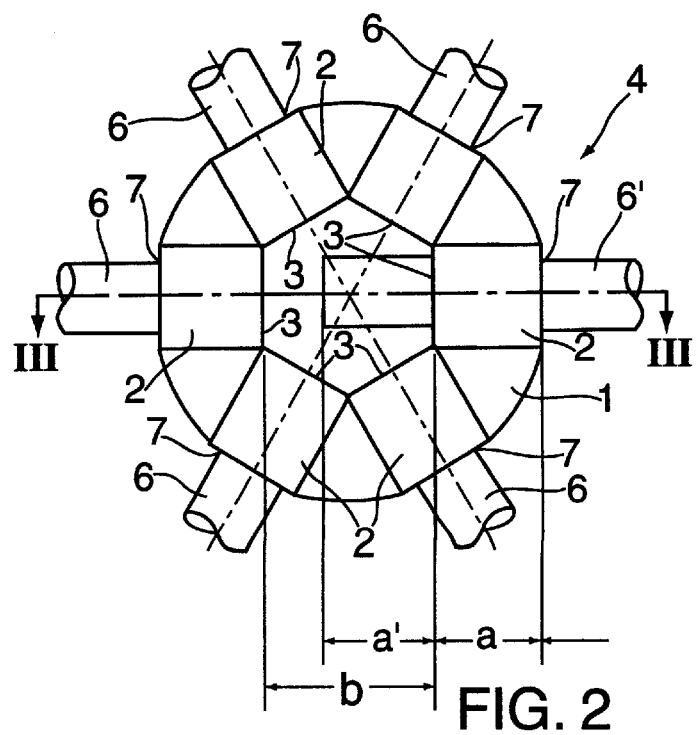
FIG. 2 is a plan view without lock cover, with the bar ends plugged and being one of them displaced towards the interior.

As may be seen in FIG. 2, one of the bars, designated with 6 has displaced a length a towards the inner part of the coupling, without locking cover, the cavity of which offers a measure b>a to allow introduction of its other end into the corresponding coupling, to this end being retracted at least in said measure a which is equal to that of tube 2 thereof.

Figure 3:
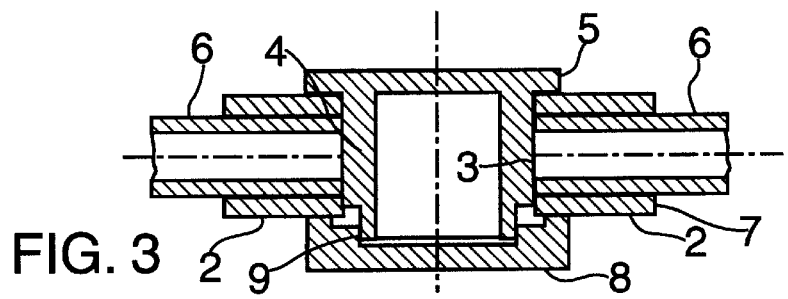
FIG. 3 is a section along the line III—III of the coupling with the lock cover in position and a threaded counter-cover (in this case).

In the section of FIG. 3 bars 6 have already been introduced into their respective tubes 2 and after introduction of the locking cover 4, these are positioned in abutment and are prevented to retract due to the retention of the remaining couplings, thus completing the asembly of the joining connection.

Figure 4:
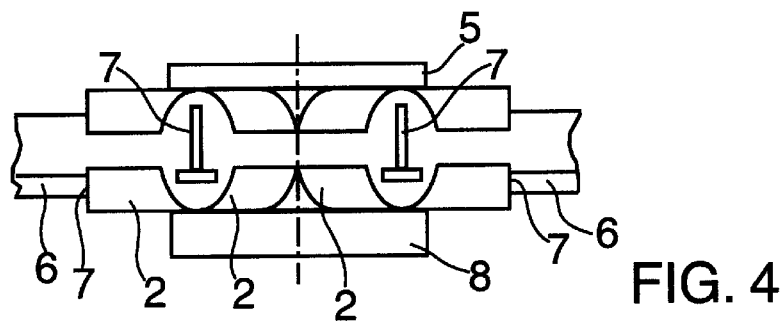
FIG. 4 is an elevation view showing bores for inserting the bars with its holes mating with "T" profiles thereof.

The option of using different profile bars is shown by the coupling of FIG. 4 in which the holes of tubes 2 copy the shape of a T profile of the arms used.

Figure 5:
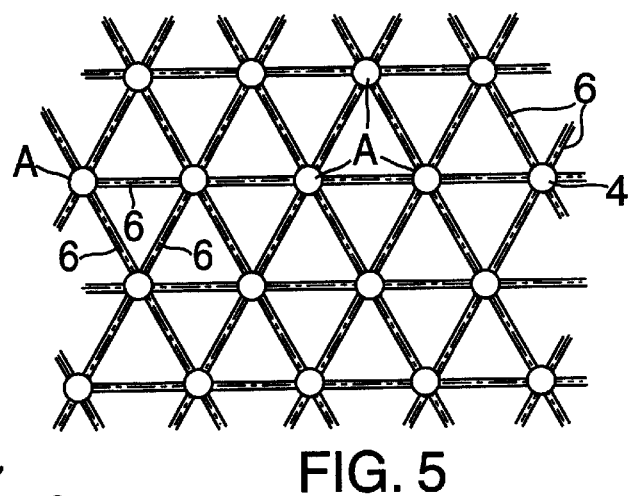
FIG. 5 is a portion of the structure formed by couplings for six bars.

In the partial view of a structure with couplings A of six bores (FIG. 5) the arrangement of couplings and bars 6 is shown.

Figure 6:
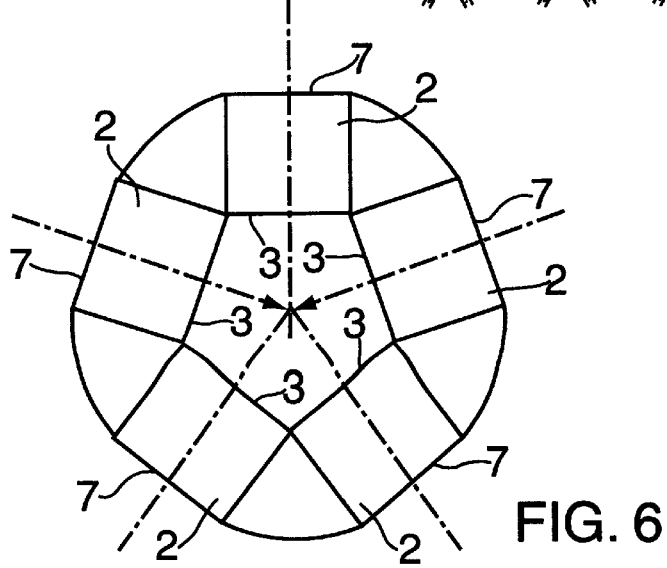
FIG. 6 is a view equivalent to that of FIG. 2, but with five plugging bores, and without the corresponding bars.

Lastly, FIG. 6 shows a plan view of a five-tube coupling, the number of tubes being variable.

It is obvious that one skilled in the art may introduce modifications and/or improvements which are to be considered within the scope of the instant invention, which is only determined by the annexed claims.

I claim:

1. A coupling system for bar structures, comprising a support shaped as an annular disk containing a plurality of radial sleeves having their longitudinal axes distributed about said annular disk, the lengths of said sleeves being smaller than the polygonal opening determined by their proximal bores lying on transverse planes thereof, equidistant from the center of said annular disk, with a lock comprising a prismatic core having the same shape as said polygonal opening but having a cross section slightly smaller than that of said polygonal opening and an upper cover of a larger cross section than that of said polygonal opening to act as a stop.

2. The device of claim 1, wherein the lock has a threaded cylindrical projection on a lower end which threaded projection exceeds the coupling height and a lower counter-cover with inner threads mating with said projection.

* * * * *